US008699573B2

(12) United States Patent
Alfonso

(10) Patent No.: US 8,699,573 B2
(45) Date of Patent: Apr. 15, 2014

(54) METHOD AND DEVICE FOR DIGITAL VIDEO ENCODING, CORRESPONDING SIGNAL AND COMPUTER-PROGRAM PRODUCT

(75) Inventor: Daniele Alfonso, Magenta (IT)

(73) Assignee: STMicroelectronics s.r.l., Agrate Brianza (IT)

( * ) Notice: Subject to any disclaimer, the term of this patent is extended or adjusted under 35 U.S.C. 154(b) by 680 days.

(21) Appl. No.: 12/768,230

(22) Filed: Apr. 27, 2010

(65) Prior Publication Data
US 2010/0254461 A1 Oct. 7, 2010

(30) Foreign Application Priority Data
May 4, 2009 (IT) .................. TO09A0356

(51) Int. Cl.
*H04B 1/66* (2006.01)
(52) U.S. Cl.
USPC .................................................. 375/240.16
(58) Field of Classification Search
USPC ........................................................ 375/240
See application file for complete search history.

(56) References Cited

U.S. PATENT DOCUMENTS

| 6,192,081 | B1 | 2/2001 | Chiang et al. | |
|---|---|---|---|---|
| 6,456,659 | B1 | 9/2002 | Zuccaro et al. | |
| 6,654,420 | B1 | 11/2003 | Snook | |
| 6,891,891 | B2* | 5/2005 | Pau et al. ................. | 375/240.16 |
| 7,031,381 | B1 | 4/2006 | Betts et al. | |
| 7,031,387 | B2 | 4/2006 | Jeon | |
| 7,177,360 | B2 | 2/2007 | Koto et al. | |
| 7,843,995 | B2* | 11/2010 | Bhaskaran et al. ...... | 375/240.13 |
| 8,036,270 | B2* | 10/2011 | Zhao et al. ............... | 375/240.15 |
| 8,233,709 | B2* | 7/2012 | Robertson et al. ............ | 382/166 |
| 2005/0114093 | A1* | 5/2005 | Cha et al. ....................... | 702/189 |
| 2006/0126725 | A1* | 6/2006 | Zeng et al. ............... | 375/240.03 |
| 2006/0245501 | A1* | 11/2006 | Gordon et al. ........... | 375/240.24 |
| 2008/0089417 | A1* | 4/2008 | Bao et al. ................. | 375/240.16 |
| 2008/0101709 | A1* | 5/2008 | Guleryuz et al. ............. | 382/238 |
| 2009/0006289 | A1* | 1/2009 | Jaros et al. ....................... | 706/12 |
| 2012/0230409 | A1* | 9/2012 | Chen et al. ............... | 375/240.15 |

FOREIGN PATENT DOCUMENTS

EP         1753247 A1    2/2007

OTHER PUBLICATIONS

Direct Mode Coding for Bipredictive Slices in the H.264 Standard; Alexis et al., IEEE, vol. 15, No. 1, pp. 119-126, 2005.*
Time-Series Similarity Queries Employing a Feature-Based Approach; R. J. Alcock and Y. Manolopoulos, Greece.*
H. Kimata, et al., "Spatial Temporal Adaptive Direct Prediction for Bi-Directional Prediction Coding on H.264", Proc. of Picture Coding Symposium 2003, Saint-Malo, FR, Apr. 23-25, 2003.

(Continued)

*Primary Examiner* — Christopher S Kelley
*Assistant Examiner* — Asmamaw G Tarko
(74) *Attorney, Agent, or Firm* — Hogan Lovells US LLP

(57) ABSTRACT

Digital video image sequences including slices of macroblocks are encoded by adopting a direct prediction mode, motion-compensated on the basis of motion vectors, chosen from between a direct spatial prediction in which the motion vectors of a given macroblock are obtained from the motion vectors of the macroblocks already encoded within one and the same image, and a direct temporal prediction, in which the motion vectors of a given macroblock are obtained from the motion vectors of the macroblocks belonging to a previously encoded image.

13 Claims, 3 Drawing Sheets

(56) References Cited

OTHER PUBLICATIONS

D. Marpe, et al., "The H.264/MPEG4 Advanced Video Coding Standard and its Applications", IEEE Communication Magazine, vol. 44, No. 8, Aug. 2006, pp. 134-143.

A.M. Tourapis, et al., "Direct Mode Coding for Bipredictive Slices in the H.264 Standard", IEEE Transactions on Circuits and systems for Video Technology, vol. 15, No. 1, Jan. 2005, pp. 119-126.

H. Kimata, et al., "Spatial Temporal Adaptive Direct Mode Coding on Bidirectional Motion Compensation Prediction", System and Computers in Japan, vol. 35, No. 14, 2004, pp. 1-9, Wiley Periodicals, Inc.

IT Written Opinion, May 4, 2009, IT Application No. TO20090356, pp. 1-10.

International Telecommunication Union, ITU-T, Series H: Audiovisual and Multimedia Systems Infrastructure of Audiovisual Services-Coding of Moving Video, "Advanced Video Coding for Generic Audiovisual Services", ITU-T Rec. H.264, Nov. 2007, pp. 1-541.

Tourapis, A., "Timestamp Independent Motion Vector Prediction for P and B Frames with Division Elimination", Joint Video Team of ISO/IEC MPEG; Jul. 26, 2002, XPO30005314, pp. 1-18.

* cited by examiner

METHOD AND DEVICE FOR DIGITAL VIDEO ENCODING, CORRESPONDING SIGNAL AND COMPUTER-PROGRAM PRODUCT

RELATED APPLICATION

The present application claims priority of Italian Patent Application No. TO2009A000356 filed May 4, 2009 entitled Method and Device for Digital Video Encoding, Corresponding Signal and Computer-Program Product, which is incorporated herein in its entirety by this reference.

FIELD OF THE INVENTION

The present disclosure relates to techniques for encoding digital video signals. The disclosure has been developed with particular attention paid to the possible application to signals encoded according to the H.264/AVC standard or similar standards.

BACKGROUND

The standard H.264/AVC (ITU-T and ISO/IEC JTC 1, "Advanced video coding for generic audiovisual services", ITU-T Rec.H.264 and ISO/IEC 14496-10 (MPEG-4 AVC), available in version 7 as of April 2007) is one of the best known video-encoding standards. For a general treatment of the characteristics of this standard, reference may be made, for example, to an article by D. Marpe et al., "The H.264/MPEG-4 Advanced Video Coding standard and its applications", *IEEE Communication Magazine*, Vol. 44, No. 8, pp. 134-144, August 2006.

In said standard, each image of the original video sequence to be encoded (represented schematically and designated by S in FIG. 1, where W and H identify, respectively, the width and the height of the image) is divided into one or more slices and subsequently encoded in a video encoder E as image of type I, P or B in the output video sequence VO. A slice is a set of macroblocks (of, for example, 16×16 pixels) belonging to one and the same image.

The slices of type I (Intra) are encoded in an independent way, while the slices of type P (Predictive) and B (Bi-predictive) are encoded by resorting to a motion-compensated prediction (MCP) with respect to one (in the case of P slices) or two (in the case of B slices) reference images.

B-type slices enable a compression factor to be obtained higher than that of I and P slices, not only on account of the motion-compensated prediction, but also thanks to a dedicated mode of encoding of the macroblock, referred to as Direct Prediction.

As described, for example in A. M. Tourapis et al., "Direct mode coding for Bi-predictive slices in the H.264 standard", *IEEE Transactions on Circuits and Systems for Video Technology*, Vol. 15, Issue 1, January 2005, pp. 119-126, in said encoding mode, the vectors used for MCP are not encoded within the bitstream in so far as they are obtained according to a fixed rule specified by the H.264/AVC standard, and hence known uniquely both to the decoder and to the encoder.

The standard specifies two different direct prediction mode, respectively, of a spatial type (Direct Spatial) and a temporal type (Direct Temporal).

In the first mode, the motion vectors (MVs) of an entire macroblock of, for example, 16×16 pixels or 8×8 pixels are obtained from the vectors of macroblocks already encoded within the same image. In the direct temporal mode, instead, the motion vectors of an entire macroblock are obtained from the motion vectors of macroblocks belonging to a previously encoded image.

The direct spatial mode hence defines a rule of spatial prediction of the motion vectors, whilst the direct temporal mode defines a rule of temporal prediction of the motion vectors.

The H.264/AVC standard enables use of a different mode of direct prediction for B-type slices subjected to encoding. The type of direct prediction chosen is signalled within the header of each B-type slice by a syntax element "direct_spatial_mv_pred_flag".

The encoding efficiency of the two possible direct prediction modes depends markedly upon the characteristics of the input signal. For some sequences, the two modes provide equivalent performance. For other sequences the spatial mode is decidedly more efficient than the temporal mode, whereas for others still the reverse is true.

Documents such as, for example, U.S. Pat. Nos. 6,192,081, 6,654,420, 7,031,381 and 7,177,360 take generically into account different possible encoding modes, including the direct mode; they do not, however, treat procedures for choosing the direct encoding mode of a macroblock.

H. Kimato et al., "Spatial temporal adaptive direct prediction for bi-directional prediction coding on H.264", *Proc. Of Picture Coding Symposium* 2003, Saint-Malo, France, Apr. 23-25, 2003. proposed a dynamic choice of the optimal mode of direct prediction in the H.264 standard, using metrics of various nature.

SUMMARY OF THE INVENTION

The inventor of the present invention has noted that there exists the interest to enable the encoding mechanism described previously to adopt selectively the two modes described above (direct spatial and direct temporal) according to the characteristics of the video signal at input—characteristics that cannot be said to be known beforehand—so as to improve the efficiency of compression without jeopardizing the quality of the final encoding result.

According to the present invention, said object is achieved thanks to a method having the characteristics recalled specifically in the ensuing claims. The invention also regards a corresponding device (i.e., an encoder), the corresponding encoded video signal, as well as a computer-program product that can be loaded into the memory of at least one computer and includes software code portions that are able to execute the steps of the method when the product is run on at least one computer. As used herein, reference to such a computer-program product is understood as being equivalent to reference to a computer-readable means that contains instructions for control of the processing system in order to co-ordinate implementation of the method according to the invention. Reference to "at least one computer" is evidently intended to highlight the possibility of the present invention being implemented in modular and/or distributed form.

The claims form an integral part of the technical disclosure provided herein in relation to the invention.

In various embodiments, the solution considered herein enables choice, in an adaptive way, of the optimal mode of prediction of the motion vectors in digital video encoding, in particular as regards the encoding modes of a direct type in compliance with the H.264/AVC standard or similar standard.

Various embodiments are based upon the spatial-temporal correlation of the motion vectors determined during a motion-estimation process. There is thus achieved a considerable gain in efficiency in terms of compression as compared to the known solutions against an additional complexity of the video-encoding process that is in effect negligible.

Various embodiments are able to recognize the optimal mode of direct prediction for each B-type slice encoded in an H.264/AVC bitstream, resulting in an optimal encoding efficiency.

Various embodiments may be applied to any digital video encoding scheme, whether it is of a form standardized at an international level (as occurs for the H.264/AVC standard) or else a proprietary system.

In certain embodiments, the encoding scheme comprises a mechanism for prediction of the motion vectors in a spatial and temporal form, as occurs for the direct-spatial encoding mode and the direct-temporal encoding mode in the H.264/AVC standard.

Various embodiments provide a system that is able to recognize the optimal mode of prediction before each image is effectively encoded via a method of pre-analysis of the video signal.

Various embodiments thus overcome the intrinsic limitation of the solutions in which the choice between the direct (spatial and temporal) encoding modes must be made beforehand for each image by the user of the encoder or by the designer of the encoder itself, enabling the encoder to test either only the direct-temporal mode or only the direct-spatial mode for each macroblock (MB).

BRIEF DESCRIPTION OF THE DRAWINGS

The invention will now be described, purely by way of non-limiting example, with reference to the annexed representations, wherein.

DETAILED DESCRIPTION OF PREFERRED EMBODIMENTS

Illustrated in the ensuing description are various specific details aimed at an in-depth understanding of the embodiments. The embodiments can be provided without one or more of the specific details, or else they can be obtained using other methods, components, materials, etc. In other cases, structures, materials, or operations that are known are not illustrated or described in detail in order not to obscure the various aspects of the embodiments.

Reference to "one embodiment" in the framework of this description is intended to indicate that a particular configuration, structure, or characteristic described in relation to the embodiment is comprised in at least one embodiment. Hence, phrases such as "in one embodiment" that may be present in different points of this description do not necessarily refer to one and the same embodiment. Furthermore, particular conformations, structures, or characteristics can be combined in any adequate way in one or more embodiments.

The references used herein are only for convenience and hence do not define the sphere of protection or the scope of the embodiments.

Figure 1:
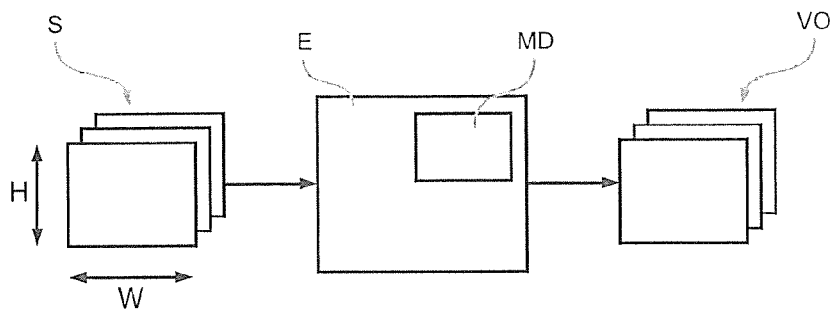
FIG. 1 illustrates a generic digital video encoding scheme.

As has already been said previously, FIG. 1 illustrates a generic digital video encoding scheme, which, starting from an input sequence S of images, which have in general a width W and a height H, produces, as a result of the action of an encoder E, a sequence of (encoded) images at output VO.

In various solutions of encoding of digital video images, each image of the input video sequence S is divided into a series of regions, referred to as macroblocks MB (FIG. 2) comprising in general A×B pixels (where not necessarily A=B, even though the most common choices are macroblocks of 16×16 or 8×8 pixels).

The macroblocks are then encoded in sequence, and for each macroblock (see MB in FIG. 3) it is then possible to choose between a more or less extensive set of encoding modes. The example considered here makes reference to the techniques in which digital image sequences organized in macroblocks are encoded with the generation of predicted images, and in particular techniques in which at least some images are encoded via techniques of motion-compensated prediction (MCP).

For example, the H.264/AVC standard envisages application to certain images of an "Intra" prediction mode that does not require an estimation of the motion. For other images there are instead applied "Inter" encoding modes, i.e., encoding modes that exploit the motion-compensated prediction and that hence require the estimation of the motion with respect to one or more reference images. There then exist "Direct" modes, i.e., encoding modes which once again exploit the motion-compensated prediction and in which the motion vectors (MVs) are predicted spatially or temporally by other motion vectors already calculated.

Figure 2:
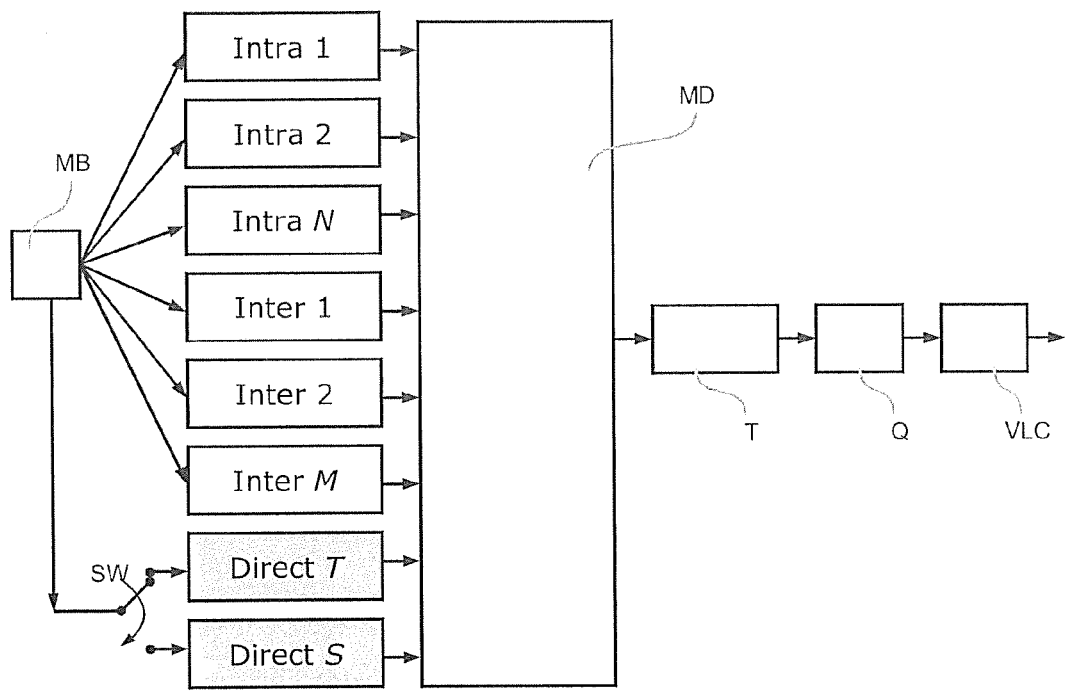
FIG. 2 illustrates schematically the criteria of carrying out a video encoding.

The encoder E hence includes within it a module MD for deciding a more convenient encoding mode from among the ones hypothesized (Intra, Inter, Direct) schematically illustrated to the left of the module MD in FIG. 2.

Next, the macroblocks are subjected to successive encoding steps, i.e., transform into the frequency domain (block T of FIG. 2), quantization (block Q in FIG. 2), variable-length encoding (block VLC of FIG. 2), etc.

All the above operations are performed according to criteria that are in themselves known and hence do not require any specific illustration herein.

For simplicity of illustration, the embodiments considered herein are referred to the H.264/AVC standard; said reference is not on the other hand to be understood as in any way limiting the scope of the description.

As has already been said in the introductory part of the present description, the direct-prediction mode applied to B-type slices enables a compression factor to be obtained that is higher than the one for I and P slices, owing to the fact that the vectors used for the motion-compensated prediction are not encoded within the bitstream but are obtained according to a given rule.

It is again recalled that B-type slices are predicted in a bi-directional way and that by "slice" is meant a set of macroblocks of pixels belonging to one and the same image.

In the embodiments considered herein, the choice between the direct (spatial and temporal) encoding modes is made by recognizing the optimal mode of prediction prior to encoding, via a procedure of pre-analysis of the video signal.

Figure 3:
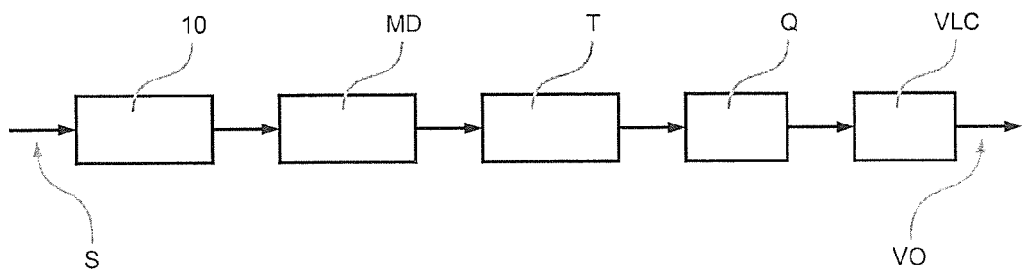
FIG. 3 illustrates one embodiment of video encoding.

The block diagram of FIG. 3 hence envisages that the module MD, to which the decision of the encoding mode is entrusted (in the specific case, reference is made to the choice between the Direct T mode and the Direct S mode represented by an ideal switch SW in FIG. 2), exploits the result of the pre-analysis of the video signal implemented in a pre-analysis module 10.

Figure 4:
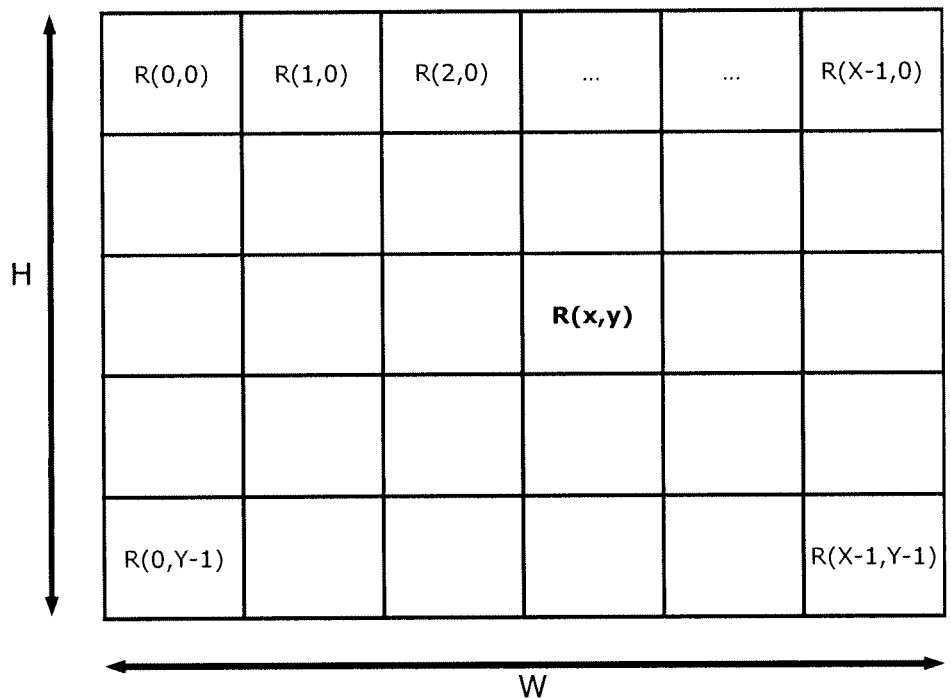
FIGS. 4 and 5 illustrate further details of one embodiment.
Figure 5:
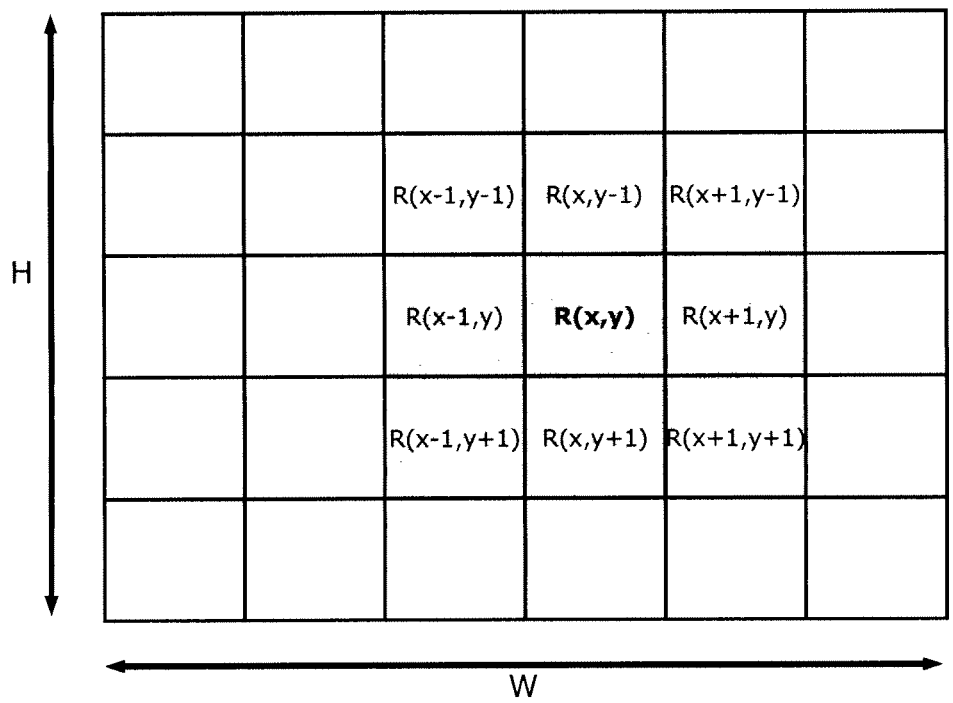
Figure 6:
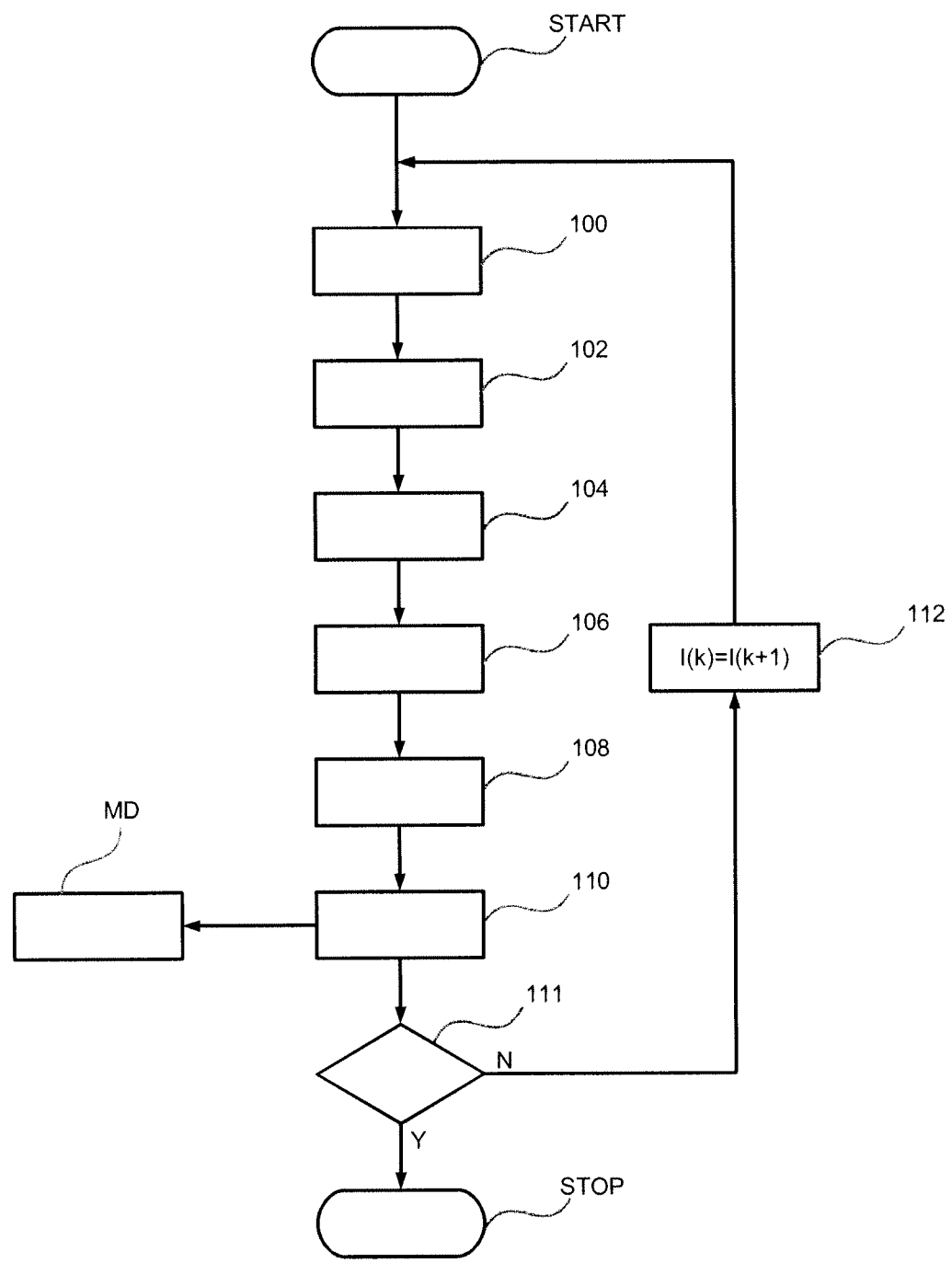
FIG. 6 is a flowchart illustrating one embodiment.

FIGS. 4 and 5 illustrate in greater detail the criterion of operation of the solution considered herein, corresponding to the flowchart of FIG. 6.

In what follows it will be assumed that the method described herein is to be applied to a video sequence S made up of N images I(0), ..., I(N−1) of dimensions W×H pixels supplied at input to a video encoder E (of a hardware, software, firmware type or based upon a combination of these), equipped with a mode-decision block MD with associated thereto a pre-analysis module 10. In various embodiments, the encoder is an encoder in compliance with the H.264/AVC standard.

The k-th image belonging to the sequence S, which is to be encoded via a procedure that is able to exploit the spatial or temporal prediction of the motion vectors (for example encoded as one or more B-type slices in the H.264/AVC standard), will be designated by I(k).

In a first step 100, after a start step, the image I(k) is divided into a set of X×Y regions R(x,y,k) such that 0≤x≤X−1 and 0≤y≤Y−1, as illustrated in FIG. 4 (where W and H designate, respectively, the width and the height of the image).

It will be assumed that, associated to each region R(x,y,k), via a motion-estimation procedure implemented in a step 102, is a motion vector MV(x,y,k) constituted by a pair of components such that MV(x,y,k) [MVX(x,y,k), MVY(x,y,k)] where MVX and MVY are two numbers in general belonging to the set $\Re$ of real numbers.

Consequently, each vector of the motion belongs to the Euclidean space $\Re^2$, i.e., the two-dimensional space of the pairs of real numbers.

The vector MV(x,y,k) is the result of the motion-estimation procedure applied to the region R(x,y,k) using as reference an image I(h) belonging to the sequence S such that 0≤h≤N−1 and h≠k.

For each region R(x,y,k) belonging to I(k) a set of NS regions associated thereto, referred to as IS, is identified. Consequently, IS is a set constituted by NS regions $R(x_1,y_1,k)$ that satisfies the relations $0 \le x_1 \le X-1$ with $x_1 \ne x$ and $0 \le y_1 \le Y-1$ with $y_1 \ne y$.

In a subsequent step 104, there is then defined a spatial-correlation index CS(x,y,k) by means of the following formula:

$$CS(x, y, k) = \frac{1}{NS} \sum_{\forall R(x_1,y_1,k) \in IS(x,y,k)} \|MV(x, y, k) - MV(x_1, y_1, k)\|_p$$

In the above formula $\|\bullet\|_p$ is the Euclidean distance of order p between two elements belonging to the Euclidean space $\Re^2$, defined as follows:

$$\|MV_1 - MV_2\|_p = \sqrt[p]{|MVX_1 - MVX_2|^p + |MVY_1 - MVY_2|^p}$$

In a possible embodiment, for each region R(x,y,k), IS is the set of the NS=8 regions surrounding it spatially, as schematically illustrated in FIG. 5.

If p=1 is chosen for calculating the Euclidean distance between the motion vectors (it will be appreciated that this choice, such as to enable maximization of the encoding efficiency of the method and minimization of the computational complexity, is not in itself imperative), the formula for calculating the spatial correlation CS(x,y,k) reduces to the following case:

$$CS(x, y, k) = \frac{1}{8} \sum_{i=-1}^{+1} \sum_{j=-1}^{+1} \|MV(x, y, k) - MV(x+i, y+j, k)\| =$$

$$= \frac{1}{8} \sum_{i=-1}^{+1} \sum_{j=-1}^{+1} [|MVX(x, y, k) - MVX(x+i, y+j, k)| +$$

$$|MVY(x, y, k) - MVY(x+i, y+j, k)|]$$

This formula is applicable to each region R(x,y,k) such that 0<x<X−1 and 0<y<Y−1, with strict inequality.

In a subsequent step 106, for each region R(x,y,k) belonging to I(k) a second set of NT regions associated thereto, referred to as IT, is defined.

In practice, IT is a set constituted by NT regions $R(x_1,y_1,h)$ such as to satisfy the relations $0 \le x_1 \le X-1$ and $0 \le y_1 \le Y-1$, where h has been defined previously.

There is then defined for each region R(x,y,k) a temporal-correlation index CT(x,y,k) by means of the following formula:

$$CT(x, y, k) = \frac{1}{NT} \sum_{\forall R(x_1,y_1,h) \in IT(x,y,k)} \|MV(x, y, k) - MV(x_1, y_1, h)\|_p$$

In a possible embodiment, for each region R(x,y,k), IT is the set constituted by the single region R(x,y,h).

Also in this case, if p=1 is chosen (in a non-imperative way) for calculating the Euclidean distance between the motion vectors, with NT=1 the formula for calculating the temporal correlation CT(x,y,k) reduces to the following case:

$$CT(x, y, k) = \|MV(x, y, k) - MV(x, y, h)\| =$$

$$= |MVX(x, y, k) - MVX(x, y, h)| +$$

$$|MVY(x, y, k) - MVY(x, y, h)|$$

In one embodiment, said formula is applied only to the regions R(x,y,k) such that 0<x<X−1 and 0<y<Y−1 (with strict inequality), for uniformity with the formula defined for spatial correlation CS(x,y,k).

In a subsequent step 108, the number NRS(k) of regions R(x,y,k) whereby CS(x,y,k) CT(x,y,k) and the number NRT (k) of regions R(x,y,k) whereby instead CS(x,y,k)>CT(x,y,k) is identified.

In a subsequent step 110, the numbers NRS(k) and NRT(k) are compared with one another, and the outcome of the comparison is used for driving the decision module MD.

In particular, in the case where NRS(k)≥NRT(k), for the prediction of the motion vectors for encoding the images I(k), the module MD chooses the spatial-prediction mode.

In the opposite case where NRS(k)<NRT(k) for encoding the images I(k) the module MD chooses the temporal-prediction mode.

It will on the other hand be appreciated that in the "borderline" case where NRS(k)=NRT(k) it is also possible to adopt, instead of spatial prediction, temporal prediction.

In other words, the sequence of the steps 100 to 108, performed in the analysis module 10, aims at making a motion estimation of the image sequence S subjected to encoding and at determining (step 110) conditions in which, within subsequent images of the sequence, the spatial correlation prevails or else the temporal correlation prevails. The outcome of the motion estimation performed during encoding hence enables the module 10 to intervene on the module MD for modifying, during encoding (hence, for example, in real time), the choice of the prediction mode between the direct spatial prediction (Direct S) and the direct temporal prediction (Direct T) according to whether the motion estimation indicates the prevalence (at the moment) of spatial correlation or else of the temporal correlation.

In embodiments dedicated to the H.264/AVC standard, by "spatial prediction" of the motion vectors is meant the direct-spatial encoding mode, whereas by "temporal prediction" of the motion vectors is meant the direct-temporal encoding mode.

After the choice implemented in step 110, the procedure detects, in a checking step 111, if the image is the last one to be encoded. If the image is not the last one, the sequence is repeated for a subsequent image after prior increment of a counter in a step 112. If the image is the last one, the procedure evolves towards a step of stop.

The procedure described may be implemented in the framework of an H.264/AVC software encoder that uses the techniques of motion estimation described in U.S. Pat. Nos. 6,456,659 and 6,891,891.

An example of such an encoder is an encoder in the family of products STm8800/8810/8815/8820 manufactured by assignee of the present invention.

Integration of the procedure described above in such an encoder is particularly simple and effective. Such an encoder operates in fact in two distinct steps of motion estimation, referred to, respectively, as coarse search and fine search.

The motion estimation referred to above in relation to block 100 of the flowchart of FIG. 6 may be the coarse search implemented in said encoders, with a minimal effect on the computational complexity of the entire H.264/AVC encoding process.

Tests conducted by the present applicant show that the solution considered herein is able to recognize the optimal direct-prediction mode for a wide range of testing sequences, guaranteeing an excellent encoding efficiency in every situation.

In particular, as compared to conventional techniques that adopt a priori a (fixed) choice either of the direct-spatial mode or of the direct-temporal mode, the solution considered herein enables a gain in encoding efficiency of up to 11.74% for 1280×720 high-definition video (HDTV) signals and of up to 21.34% for 1920×1080 high-definition video (HDTV) signals.

In one embodiment, the solution considered herein receives at input a set of motion vectors and produces at output a decision as regards the direct encoding method to be adopted.

Application of said solution is hence recognizable, for example, in any H.264/AVC-encoded bitstream. Such a bitstream contains in fact a set of encoded motion vectors for each B-type slice. In the same way, an H.264/AVC bitstream contains for each B-type slice the indication of which network-prediction method has been used for encoding, specified by the syntax element direct_mv_spatial_pred_flag present in the header of each B-type slice. Via the analysis (decoding) of such a bitstream it is possible to determine whether the direct encoding mode is fixed or else whether it varies in general for each B-type image. It is likewise possible to verify the existence of a link between the variations of the direct prediction mode used and the spatial and temporal correlation of the motion vectors present in the stream.

Of course, without prejudice to the principle of the invention, the details of implementation and the embodiments may vary, even significantly, with respect to what has been illustrated herein, purely by way of non-limiting example, without thereby departing from the scope of the present invention, as defined by the annexed claims.

The invention claimed is:

1. A computer program product stored on a non-transitory computer-readable medium loadable in the memory of at least one computer and including software code portions to implement a method of encoding digital video image sequences including macroblocks by adopting a direct motion-compensated prediction mode based on motion vectors, said prediction mode selected between direct spatial prediction wherein motion vectors for a given macroblock are obtained from motion vectors of macroblocks already encoded within a same image, and direct temporal prediction wherein motion vectors for a given macroblock are obtained from motion vectors of macroblocks of an image previously encoded, the method including:
    performing a motion estimation of the image sequence subject to encoding, by determining conditions wherein spatial correlation or temporal correlation between subsequent images prevails;
    adopting, as said motion-compensated prediction mode during encoding, said direct spatial prediction or said direct temporal prediction according to whether said motion estimation indicates that spatial correlation or temporal correlation prevails;
    subdividing said images in regions by determining, for said regions, respective spatial correlation and temporal correlation indexes;
    comparing said respective spatial correlation and temporal correlation indexes to identify, for each of said regions, which of said correlation indexes has a higher value;
    identifying the number of said regions where said spatial correlation index has a higher value and the number of said regions where said temporal correlation index has a higher value; and
    adopting said direct spatial prediction or said direct temporal prediction according to which is the higher between:
        the number of said regions where said spatial correlation index has a higher value, or
        the number of said regions where said temporal correlation index has a higher value.

2. The computer program product of claim 1, including adopting said direct spatial prediction when the number of said regions where said spatial correlation index has a higher value is greater than or equal to the number of said regions where said temporal correlation index has a higher value.

3. The computer program product of claim 1, including adopting said direct temporal prediction when the number of said regions where said spatial correlation index has a higher value is less than the number of said regions where said temporal correlation index has a higher value.

4. The computer program product of claim 1, further comprising:
    determining said respective correlation indexes as a function of Euclidean distance between a motion vector associated to one of the regions in a given image in said image sequence and a set of motion vectors associated to reference regions, wherein for said spatial correlation index, said reference regions are selected belonging to said given image, and for said temporal correlation index, said reference regions are selected belonging to images in said image sequence different from said given image.

5. The computer program product of claim 4, including using, as said function of Euclidean distance, a weighted average, preferably an arithmetic average, of Euclidean distances between a motion vector associated to one of the regions in a given image in said image sequence(and a set of motion vectors associated to reference regions.

6. The computer program product of claim 2, further comprising:
determining said respective correlation indexes as a function of Euclidean distance between a motion vector associated to one of the regions in a given image in said image sequence and a set of motion vectors associated to reference regions, wherein for said spatial correlation index, said reference regions are selected belonging to said given image, and for said temporal correlation index, said reference regions are selected belonging to images in said image sequence different from said given image.

7. The computer program product of claim 3, further comprising:
determining said respective correlation indexes as a function of Euclidean distance between a motion vector associated to one of the regions in a given image in said image sequence and a set of motion vectors associated to reference regions, wherein for said spatial correlation index, said reference regions are selected belonging to said given image, and for said temporal correlation index, said reference regions are selected belonging to images in said image sequence different from said given image.

8. The computer program product of claim 4, wherein said Euclidean distance is a first order Euclidean distance.

9. The computer program product of claim 7, wherein said Euclidean distance is a first order Euclidean distance.

10. The computer program product of claim 1 applied to encoding digital video images according to the H.264/AVC standard.

11. The computer program product of claim 10, for encoding B-type slices.

12. The computer program product of claim 1, further comprising conveying an encoded digital video image sequence with syntax elements indicative of the direct prediction mode adopted for encoding the respective images.

13. An integrated circuit encoder device configured for:
encoding digital video image sequences including macroblocks by adopting a direct motion-compensated prediction mode based on motion vectors, said prediction mode selected between direct spatial prediction wherein motion vectors for a given macroblock are obtained from motion vectors of macroblocks already encoded within a same image, and direct temporal prediction wherein motion vectors for a given macroblock are obtained from motion vectors of macroblocks of an image previously encoded;
performing a motion estimation of the image sequence subject to encoding, by determining conditions wherein spatial correlation or temporal correlation between subsequent images prevails;
adopting, as said motion-compensated prediction mode during encoding, said direct spatial prediction or said direct temporal prediction according to whether said motion estimation indicates that spatial correlation or temporal correlation prevails;
subdividing said images in regions by determining, for said regions, respective spatial correlation and temporal correlation indexes;
comparing said respective spatial correlation and temporal correlation indexes to identify, for each of said regions, which of said correlation indexes has a higher value;
identifying the number of said regions where said spatial correlation index has a higher value and the number of said regions where said temporal correlation index has a higher value; and
adopting said direct spatial prediction or said direct temporal prediction according to which is the higher between:
the number of said regions where said spatial correlation index has a higher value, or
the number of said regions where said temporal correlation index has a higher value.

* * * * *

UNITED STATES PATENT AND TRADEMARK OFFICE
CERTIFICATE OF CORRECTION

| | | |
|---|---|---|
| PATENT NO. | : 8,699,573 B2 | Page 1 of 1 |
| APPLICATION NO. | : 12/768230 | |
| DATED | : April 15, 2014 | |
| INVENTOR(S) | : Daniele Alfonso | |

It is certified that error appears in the above-identified patent and that said Letters Patent is hereby corrected as shown below:

On the Title Page

Item (30) Foreign Application Priority Data

TO09A0356 should be --TO09A00356--

Signed and Sealed this
Twenty-ninth Day of July, 2014

Michelle K. Lee
*Deputy Director of the United States Patent and Trademark Office*